United States Patent
Song

(10) Patent No.: US 7,645,325 B2
(45) Date of Patent: Jan. 12, 2010

(54) OXYGEN PRODUCTION PROCESS USING THREE-STAGE PRESSURE SWING ADSORPTION PLANTS

(75) Inventor: Yuwen Song, Chengdu (CN)

(73) Assignee: Chendgu Tianli Chemical Engineering Technology Co., Ltd., Chengdu (CN)

( * ) Notice: Subject to any disclaimer, the term of this patent is extended or adjusted under 35 U.S.C. 154(b) by 381 days.

(21) Appl. No.: 11/629,144

(22) PCT Filed: May 9, 2005

(86) PCT No.: PCT/CN2005/000642

§ 371 (c)(1),
(2), (4) Date: Feb. 8, 2007

(87) PCT Pub. No.: WO2005/120682

PCT Pub. Date: Dec. 22, 2005

(65) Prior Publication Data

US 2007/0227354 A1 Oct. 4, 2007

(30) Foreign Application Priority Data

Jun. 11, 2004 (CN) .................. 2004 1 0046599

(51) Int. Cl.
*B01D 53/047* (2006.01)
*C01B 13/02* (2006.01)

(52) U.S. Cl. ................. 95/96; 95/130; 95/139

(58) Field of Classification Search ............. 95/96, 95/117, 130, 139, 148; 96/131, 132, 121
See application file for complete search history.

(56) References Cited

U.S. PATENT DOCUMENTS

| | | | | |
|---|---|---|---|---|
| 3,957,463 A | * | 5/1976 | Drissel et al. | 95/103 |
| 4,190,424 A | | 2/1980 | Armond et al. | 55/25 |
| 4,249,915 A | * | 2/1981 | Sircar et al. | 95/99 |
| 4,539,019 A | * | 9/1985 | Koch | 95/19 |
| 4,595,083 A | | 6/1986 | Mackenzie et al. | 188/196 |
| 4,880,443 A | * | 11/1989 | Miller et al. | 95/98 |
| 5,395,427 A | | 3/1995 | Kumar et al. | 95/101 |
| 5,507,957 A | * | 4/1996 | Garrett et al. | 210/760 |
| 5,518,526 A | * | 5/1996 | Baksh et al. | 95/100 |
| 5,914,455 A | * | 6/1999 | Jain et al. | 95/96 |
| 6,475,265 B1 | | 11/2002 | Baksh et al. | 95/96 |

FOREIGN PATENT DOCUMENTS

CN 1252322 A 5/2000

* cited by examiner

*Primary Examiner*—Frank M Lawrence
(74) *Attorney, Agent, or Firm*—McCormick, Paulding & Huber LLP

(57) ABSTRACT

A process for producing oxygen by using of three-stage pressure swing adsorption plants, wherein the process is used to separate nitrogen and oxygen from a feed air stream, the product can be oxygen or nitrogen or both of them. The process utilizes three-stage pressure swing adsorption plants which are serially connected. In the first stage, carbon dioxide, water and part of nitrogen are removed and nitrogen is concentrated. In the second stage, nitrogen is further separated from the effluent intermediate gas from the adsorption step in the adsorption towers of the first stage and oxygen is concentrated to the desired concentration. In the third stage, nitrogen and argon are further separated from the effluent oxygen-enriched mixture gas from the adsorption step in the adsorption towers of the second stage and the concentration of oxygen is raised to 95V % or more.

38 Claims, 2 Drawing Sheets

| Time Tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | A | | | | | | P' | | | VC | | | 2ER | | | R' | | | FR | | | | | |
| B | R' | | | FR | | | A | | | | | | P' | | | VC | | | | | | 2ER | | |
| C | VC | | | 2ER | | | R' | | | FR | | | A | | | | | | P' | | | VC | | |
| D | P' | | | VC | | | | | | 2ER | | | R' | | | FR | | | A | | | | | |

| Time / Tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | A | A | A | A | A | A | P' | P' | P' | VC | VC | VC | VC | VC | VC | 2ER | 2ER | 2ER | R' | R' | R' | FR | FR | FR |
| B | R' | R' | R' | FR | FR | FR | A | A | A | A | A | A | P' | P' | P' | VC | VC | VC | VC | VC | VC | 2ER | 2ER | 2ER |
| C | VC | VC | VC | 2ER | 2ER | 2ER | R' | R' | R' | FR | FR | FR | A | A | A | A | A | A | P' | P' | P' | VC | VC | VC |
| D | P' | P' | P' | VC | VC | VC | VC | VC | VC | 2ER | 2ER | 2ER | R' | R' | R' | FR | FR | FR | A | A | A | A | A | A |

FIG. 1

| Time / Tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | A | A | A | A | A | A | A | A | A | A | A | A | A | A | A | BD' | BD' | BD' | FR | FR | FR | A | A | A |
| B | FR | FR | FR | A | A | A | A | A | A | A | A | A | A | A | A | A | A | A | A | A | A | BD' | BD' | BD' |
| C | A | A | A | BD' | BD' | BD' | FR | FR | FR | A | A | A | A | A | A | A | A | A | A | A | A | A | A | A |
| D | A | A | A | A | A | A | A | A | A | BD' | BD' | BD' | FR | FR | FR | A | A | A | A | A | A | A | A | A |

FIG. 2

| Time / Tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | A | A | A | A | A | A | P' | P' | P' | P' | P' | P' | D | D | D | D | D | D | R' | R' | R' | R' | R' | R' |
| B | R' | R' | R' | R' | R' | R' | A | A | A | A | A | A | P' | P' | P' | P' | P' | P' | D | D | D | D | D | D |
| C | D | D | D | D | D | D | R' | R' | R' | R' | R' | R' | A | A | A | A | A | A | P' | P' | P' | P' | P' | P' |
| D | P' | P' | P' | P' | P' | P' | D | D | D | D | D | D | R' | R' | R' | R' | R' | R' | A | A | A | A | A | A |

OXYGEN PRODUCTION PROCESS USING THREE-STAGE PRESSURE SWING ADSORPTION PLANTS

CROSS REFERENCE TO RELATED APPLICATIONS

This application is entitled to the benefit of and incorporates by reference essential subject matter disclosed in International Patent Application No. PCT/CN2005/000642 filed on May 9, 2005 and Chinese Patent Application No. 200410046599.9 filed Jun. 11, 2004.

BACKGROUND OF THE INVENTION

1. Field of the Invention

The present invention relates to a oxygen production process using three-stage pressure swing adsorption plants.

2. Description of the Related Art

At present, patent literatures and documents in relation to a method of making pure oxygen from air with three-stage pressure-swing adsorption technique have not been published at home and abroad. All of methods of making pure (or enriched) oxygen from air known in the art adopted the two-stage pressure-swing adsorption device. For example, CN1252322A, U.S. Pat. Nos. 4,190,424, 4,595,083 and 5,395,427, etc. In the art, the concentration of oxygen was higher in the adsorption tower before performing desorption-blowdown step. The investment and the electricity consumption of the whole oxygen-making device were very high because the recovery of oxygen was low.

BRIEF SUMMARY OF THE INVENTION

The target of the present invention is to supply a method of making oxygen with three-stage pressure-swing adsorption device. This method can overcome the technical problems of prior art mentioned above. Comparing with prior art, this method can reduce investment and electricity consumption greatly and increase oxygen recovery of the whole device.

The present invention adopts the three-stage pressure-swing adsorption device to separate oxygen and nitrogen from air. The production can be pure oxygen or pure nitrogen or both of them. The method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in oxygen-enriched gas mixture which is discharged from the adsorption tower in the adsorption step of the second stage and increase the concentration of oxygen up to above 95V %. The adsorption tower of the first stage sequentially undergoes the following steps in one circulation period: adsorption A, purge P', evacuation VC, the second stage gas backward equalization repressurization 2ER, purge gas repressurization R', final repressurization FR. The adsorption tower of the second stage sequentially undergoes the following steps in one circulation period: adsorption A, backward equalization depressurization BD', final repressurization FR. The adsorption tower of the third stage sequentially undergoes the following steps in one circulation period: adsorption A, oxygen product purge P', oxygen product depressurization D, and purge gas repressurization R'.

The adsorption tower of the second stage adds the cocurrent equalization depressurization ED step after the adsorption A step, and adds the backward repressurization ER step after the backward equalization depressurization BD' step in the meantime; the gas mixture of the repressurization ER step comes from the depressurization ED step;

and/or the adsorption tower of the third stage adds the cocurrent equalization depressurization ED step after the adsorption A step, and adds the backward repressurization ER step after the purge gas repressurization R' step in the meantime; the gas mixture of the repressurization ER step comes from the depressurization ED step.

The adsorption tower of the first stage adds the two-end equalization depressurization 2ED' step after the adsorption A step, and adds the two-end equalization repressurization 2ER' step after the second stage gas backward equalization repressurization 2ER step in the meantime; the gas mixture of the two-end equalization repressurization 2ER' step comes from the equalization depressurization 2ED' step.

The adsorption tower of the third stage adds evacuation VC step after the oxygen product depressurization D step.

The adsorption tower of the first stage adds backward depressurization BD step after the purge P' step.

The gas mixture discharged from the backward equalization depressurization BD' step in the adsorption tower of the second stage enters into the buffer vessel V until pressure balance; in the meantime, the adsorption tower of the first stage is connected with the buffer vessel V, while proceeding the second stage gas backward equalization repressurization 2ER, until pressure balance.

The average concentration of oxygen in outlet gas which comes from the adsorption tower in the adsorption step of the first stage, is 21~80 V %.

The average concentration of oxygen in outlet gas which comes from the adsorption tower in the adsorption step of the first stage, is 21~25 V %.

The pressure of adsorption step A of three-stage pressure-swing adsorption device is 0.001~0.6 Mpa(g);

or the pressure of adsorption step A of the first stage and the second stage pressure-swing adsorption device is 0.001~0.05 Mpa(g); the pressure of adsorption step A of the third stage pressure-swing adsorption device is 0.1~0.6 Mpa(g).

The absorbents which are packed in the adsorption tower of the first stage are activated alumina and molecular sieve from the bottom up; the adsorbent which is packed in the adsorption tower of the second stage is molecular sieve only; and the adsorbent which is packed in the adsorption tower of the third stage is oxygen adsorption equilibrium adsorbent or selective adsorbent of oxygen by adsorption kinetics.

The frequency of the backward equalization depressurization ED' step in the adsorption tower of the second stage and the frequency of the second stage gas backward equalization repressurization 2ER step in the adsorption tower of the first stage are more than or equal to 1.

The frequency of the backward equalization depressurization ED' step in the adsorption tower of the second stage and the frequency of the second stage gas backward equalization repressurization 2ER step in the adsorption tower of the first stage are 3~7.

The present invention adopts the three-stage pressure-swing adsorption device to separate oxygen and nitrogen from air. The production can be pure oxygen or pure nitrogen or both of them. The method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level. The adsorption tower of the first stage sequentially undergoes the following steps in one circulation period: adsorption A, two-end equalization depressurization 2ED', purge P', backward depressurization BD, the second stage gas backward equalization repressurization 2ER, two-end equalization repressurization 2ER', purge gas repressurization R', final repressurization FR. The adsorption tower of the second stage sequentially undergoes the following steps in one circulation period: adsorption A, cocurrent equalization depressurization ED, backward equalization depressurization BD', backward equalization repressurization ER, final repressurization FR. The adsorption tower of the third stage sequentially undergoes the following steps in one circulation period: adsorption A, oxygen product purge P', oxygen product depressurization D, and purge gas repressurization R'.

The pressure of adsorption A step of three-stage pressure-swing adsorption device is 0.2~0.6 Mpa(g).

The present invention adopts the three-stage pressure-swing adsorption device to separate oxygen and nitrogen from air. The production can be pure oxygen or pure nitrogen or both of them. The method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level. The adsorption tower of the first stage sequentially undergoes the following steps in one circulation period: adsorption A, two-end equalization depressurization 2ED', evacuation VC, the second stage gas backward equalization repressurization 2ER, two-end equalization repressurization 2ER', final repressurization FR. The adsorption tower of the second stage sequentially undergoes the following steps in one circulation period: adsorption A, backward equalization depressurization BD', final repressurization FR. The adsorption tower of the third stage sequentially undergoes the following steps in one circulation period: adsorption A, oxygen product purge P', oxygen product depressurization D, and purge gas repressurization R'.

The present invention adopts the three-stage pressure-swing adsorption device to separate oxygen and nitrogen from air. The production can be pure oxygen or pure nitrogen or both of them. The method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in oxygen-enriched gas mixture which is discharged from the adsorption tower in the adsorption step of the second stage and increase the concentration of oxygen up to above 95V %. The adsorption tower of the first stage sequentially undergoes the following steps in one circulation period: adsorption A, purge P', evacuation VC, the second stage gas backward equalization repressurization 2ER, purge gas repressurization R', final repressurization FR. The adsorption tower of the second stage sequentially undergoes the following steps in one circulation period: adsorption A, backward equalization depressurization BD', final repressurization FR. The adsorption tower of the third stage sequentially undergoes the following steps in one circulation period: adsorption A, cocurrent equalization depressurization ED, oxygen product depressurization D, and backward equalization repressurization ER.

The adsorption tower of the third stage adds the evacuation VC step after the oxygen product depressurization D step.

The present invention adopts the three-stage pressure-swing adsorption device to separate oxygen and nitrogen from air. The production can be pure oxygen or pure nitrogen or both of them. The method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in oxygen-enriched gas mixture which is discharged from the adsorption tower in the adsorption step of the second stage and increase the concentration of oxygen up to above 95V %. The adsorption tower of the first stage sequentially undergoes the following steps in one circulation period: adsorption A, purge P', evacuation VC, the second stage gas backward equalization repressurization 2ER, purge gas repressurization R', final repressurization FR. The adsorption tower of the second stage sequentially undergoes the following steps in one circulation period: adsorption A, backward equalization depressurization BD', final repressurization FR. The adsorption tower of the third stage sequentially undergoes the following steps in one circulation period: adsorption A, cocurrent equalization depressurization ED, evacuation VC, and backward equalization repressurization ER.

BRIEF DESCRIPTION OF THE DRAWINGS

FIG. 1 is the working procedure scheme of technology steps for the first stage pressure-swing adsorption device of example.

FIG. 2 is the working procedure scheme of technology steps for the second stage pressure-swing adsorption device of example.

FIG. 3 is the working procedure scheme of technology steps for the third stage pressure-swing adsorption device of example.

DETAILED DESCRIPTION OF THE INVENTION

Figure 4:
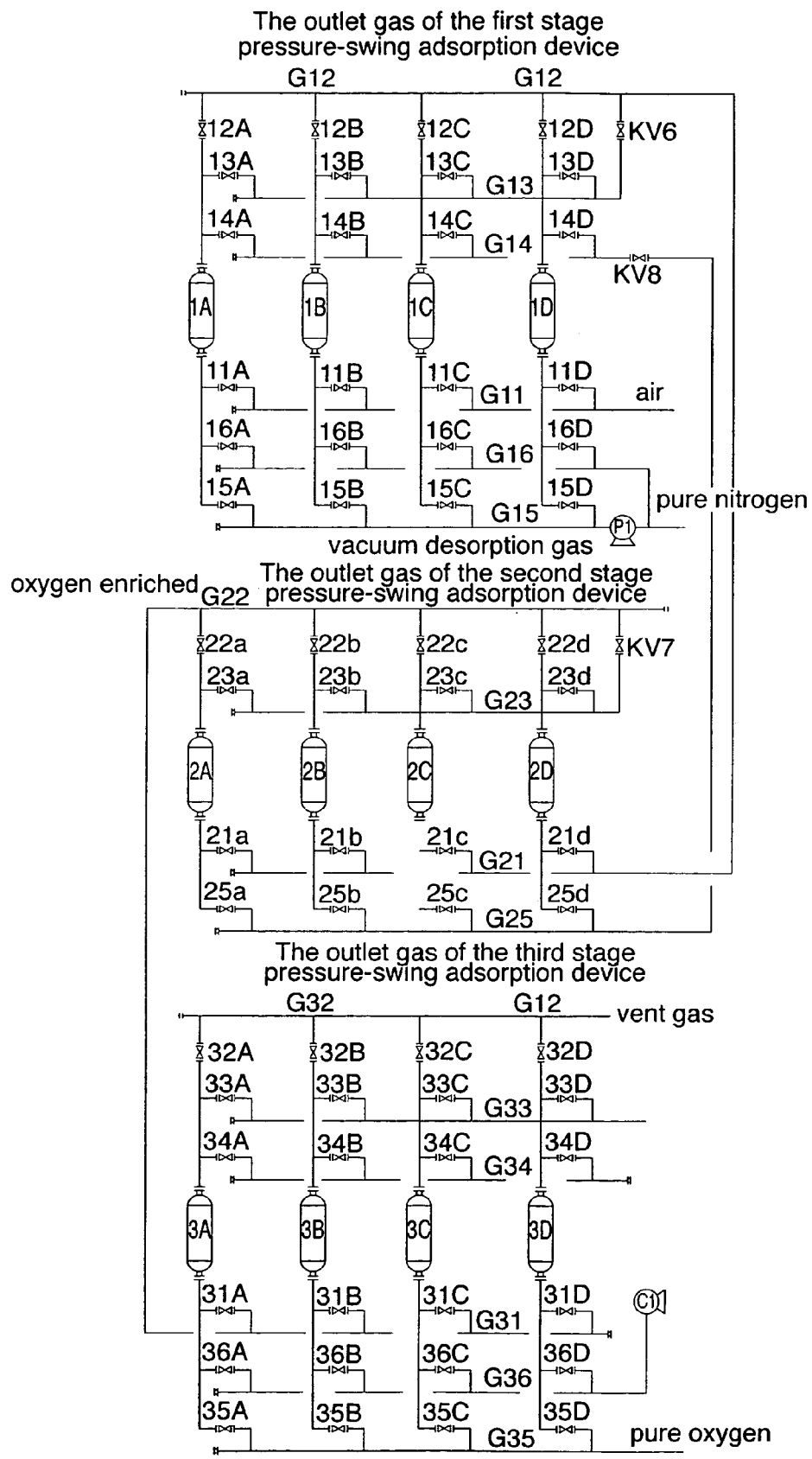
FIG. 4 is the technology flow sheet of example 1.

The raw material gas of the present invention is air and its typical components are shown in the following table:

| | component | | | | | |
|---|---|---|---|---|---|---|
| | $O_2$ | $N_2$ | Ar | $CO_2$ | others | Σ |
| Conc. (%) (V) | 20.93 | 78.03 | 0.932 | 0.03 | 0.078 | 100 |

The present invention adopts the three-stage pressure-swing adsorption technique to produce the enriched oxygen from air. The method adopts three-stage pressure-swing adsorption device operating in series, wherein the first stage is used to remove gaseous water and carbon dioxide as well as partial nitrogen. The average concentration of oxygen in outlet gas of the adsorption tower in the adsorption step is 21~80% (V). The adsorbents in the adsorption tower of the first stage are activated alumina and molecular sieve from the bottom up. The second stage is used to further remove the nitrogen in interim gas which is discharged from the adsorption tower in the adsorption step of the first stage and increase the concentration of oxygen up to the desired level. The adsorbent which is packed in the adsorption tower of the second stage is molecular sieve. The third stage is used to further remove the nitrogen and argon in gas mixture which is discharged from the adsorption tower in the adsorption step of the second stage and increase the concentration of oxygen up to above 99.5V %. The adsorbent in the adsorption tower of the third stage is carbon molecular sieve or oxygen adsorption equilibrium adsorbent. The pressure of adsorption step A of three-stage pressure-swing adsorption device is 0.001~0.6 Mpa(g). Each adsorption tower of the three-stage pressure-swing adsorption device sequentially undergoes the following steps in one circulation period:

The First Stage:

(1) Adsorption A

Feed air into the inlet of the adsorption tower in adsorption step, the adsorbents in the adsorption tower adsorb selectively water, carbon dioxide and partial nitrogen, etc. in turn from the air. The nonadsorbed partial nitrogen and weakly adsorbed argon, etc. are discharged from the outlet and enter into the adsorption tower in adsorption step of the second stage. The total amount of adsorbed water, carbon dioxide and partial nitrogen etc. increases gradually with the increase of time. Stop feeding air when the adsorbents are saturated by the components mentioned above, and the adsorption ends here.

(2) Two-End Equalization Depressurization 2ED'

After the adsorption, the concentration of oxygen in the dead-space of the adsorption tower is relatively higher and this part of oxygen should be recovered and reused. Thus, decrease the pressure of the gas in the adsorption tower from both ends of top and bottom. The gas of dead-space is discharged from the two ends of the adsorption tower and enters into the corresponding adsorption tower of the first stage that has completed the second stage gas backward equalization repressurization 2ER step to perform the two-end repressurization 2ER' step. The frequency of two-end equalization depressurization 2ED' can be 1 or above (for example, 1 to 3 times).

After the adsorption, it can also perform the step of cocurrent equalization depressurization or backward equalization depressurization only.

(3) Purge P'

After the two-end equalization depressurization 2ED' step, replace the remained oxygen in the adsorption tower out by feeding the gas got from evacuation VC step of the first stage from the bottom of the adsorption tower. The gas mixture replaced from the adsorption tower enters into the corresponding adsorption tower of the first stage that has completed the second stage gas backward equalization repressurization 2ER step or the two-end equalization repressurization 2ER' step to perform the purge gas repressurization R' step.

(4) Backward Depressurization BD

After purge P' step, this part of gas is backward vented to the atmosphere from the bottom of the adsorption tower or act as product.

(5) Evacuation VC

After purge P' step, pull out and blow off the water, carbon dioxide and nitrogen adsorbed by the adsorbents from the bottom of the adsorption tower with the vacuum pump. This step enable the absorbent to obtain the regeneration.

(6) The Second Stage Gas Backward Equalization Repressurization 2ER

After evacuation VC step, the gas discharged from the adsorption tower of the second stage that has completed the adsorption or the cocurrent equalization depressurization ED step enters into the adsorption tower of the first stage that has completed evacuation VC step, and lifts the pressure of the adsorption tower. The frequency of the second stage gas backward equalization repressurization 2ER can be 1 or above (for example, 1 to 7 times).

(7) Two-End Equalization Repressurization 2ER'

After the second stage gas backward equalization repressurization 2ER step, the gas discharged from the two-end equalization depressurization 2ED' step of the first stage enters into the adsorption tower from the inlet end and the outlet end, and lifts the pressure of the adsorption tower gradually. The frequency of 2ER' and 2ED' is equal. The gas of 2ER' comes from 2ED' gas of different adsorption tower every time. The 2ER' step of the adsorption tower of the first stage is different from the general equalization repressurization ER step. In the general ER step, the gas enters at the outlet end of the adsorption tower. By contrast, in the 2ER' step of the adsorption tower of the first stage, the gas enters at the inlet end and the outlet end of the adsorption tower.

(8) Purge Gas Repressurization R'

After the 2ER' step or the 2ER step, the pressure of the adsorption tower is increased by the gas discharged from the outlet of the adsorption tower in the purge P' step of the first stage.

(9) Final Repressurization FR

After the R' step, the pressure of the adsorption tower is increased from the top with the gas discharged from the outlet of the adsorption tower in the adsorption step or with the raw material air until the adsorption pressure.

The Second Stage:

(1) Adsorption A

Feed the outlet gas of the adsorption tower in the adsorption step of the first stage into the adsorption tower in the adsorption step of the second stage. The adsorbent of the adsorption tower adsorbs selectively nitrogen. The weakly adsorbed oxygen and argon etc. are discharged from the outlet end and enter into enriched oxygen buffer vessel or the next step. The total amount of adsorbed nitrogen increases gradually with the increase of time. Stop feeding gas when the adsorbent is saturated by nitrogen and the adsorption ends here. The concentration of oxygen in the outlet gas should be controlled in the level of production required.

(2) Cocurrent Equalization Depressurization ED

After the adsorption, the dead-space gas in the adsorption tower is discharged from the outlet and enters into the corresponding adsorption tower of the second stage that has completed the backward equalization depressurization BD' step to increase the pressure. The pressure of the two towers can be equal or not, to satisfy the requirement of the concentration of the enriched oxygen in production. The frequency of ED can be 1 or above (for example, 1 to 3 times).

(3) Backward Equalization Depressurization BD'

After adsorption or ED step, perform the second stage gas backward equalization repressurization 2ER step directly for several times with the gas discharged backward from the bottom of the adsorption tower for the adsorption tower of the first stage that has completed VC step. The frequency of BD' can be 1 or above (for example, 1 to 7 times).

When performing 2ER mentioned above, we can also discharge backward the gas in the adsorption tower into a buffer vessel at first, and then transfer it into the adsorption tower that has completed VC step in first stage to perform the 2ER step. The number of the buffer vessels equals to the frequency of BD' step.

(4) Backward Repressurization ER

After backward equalization depressurization BD' step, the gas discharged from the ED step enters into the adsorption tower at the outlet end, and increases the pressure of the adsorption tower.

(5) Final Repressurization FR

The gas discharged from the outlet of the adsorption tower in the adsorption step is used to increase the pressure of the adsorption tower from the top until the adsorption pressure.

The Third Stage:

(1) Adsorption A

Feed oxygen-enriched gas mixture into the inlet of the adsorption tower in adsorption step, the adsorbent in the adsorption tower adsorbs selectively oxygen, etc. in turn from the oxygen-enriched gas mixture. The nonadsorbed nitrogen or argon, etc. are discharged from the outlet to vent to the atmosphere or serve as other use. The total amount of adsorbed oxygen etc. increases gradually with the increase of time. Stop feeding gas when the adsorbent is saturated by oxygen mentioned above, and the adsorption ends here.

(2) Cocurrent Equalization Depressurization ED

After the adsorption, the dead-space gas in the adsorption tower is discharged from the outlet and enters into the corresponding adsorption tower of the third stage that has completed the purge gas repressurization R' step to increase the pressure. The pressure of the two towers can be equal or not, to satisfy the requirement of the concentration of oxygen in production. The frequency of ED can be 1 or above (for example, 1 to 3 times).

(3) Purge P'

After the cocurrent equalization depressurization ED step, replace the remained nitrogen and argon in the adsorption tower out by feeding the compressive product oxygen from the bottom of the adsorption tower; the product oxygen comes from the adsorption tower of the third stage that has completed purge P' step. The gas mixture replaced from the adsorption tower enters into the corresponding adsorption tower of the third stage that has completed the depressurization D step or the evacuation VC step to perform the purge gas repressurization R' step.

(4) Oxygen Product Depressurization D

After the purge P' step, this part of gas is discharged from the adsorption tower. One part of the gas acts as product, the other part of the gas is pressurized to purge the adsorbent in the adsorption tower.

(5) Evacuation VC

After the purge P' step or the cocurrent equalization depressurization ED step or the oxygen product depressurization D step, the pure oxygen adsorbed by the adsorbent is pulled out from the bottom of the adsorption tower with the vacuum pump and enters into the next step. This step enable the absorbent to obtain the regeneration at the same time.

(6) Purge Gas Repressurization R'

After the oxygen product depressurization D step or the evacuation VC step, the pressure of the adsorption tower is increased by the gas discharged from the outlet of the other adsorption tower in the purge P' step of the third stage.

(7) Backward Equalization Repressurization ER

After the oxygen product depressurization D step or the purge gas repressurization R' step or the evacuation VC step, the gas discharged from the cocurrent equalization depressurization ED step enters into the adsorption tower from the outlet, and lifts the pressure of the adsorption tower.

EXAMPLE 1

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | component | | | | | |
|---|---|---|---|---|---|---|
| | $O_2$ | $N_2$ | Ar | $CO_2$ | others | Σ |
| Conc. (%) (V) | 20.93 | 78.03 | 0.932 | 0.03 | 0.078 | 100 |

Temp.: ≦45° C.
pressure: 0.6 MPa (G)

As shown in the FIG. 4, the first stage pressure-swing adsorption device is composed of four adsorption towers 1A~1D; the adsorbents in the adsorption tower of the first stage are activated alumina and molecular sieve in turn from the bottom up; single tower is simultaneously in an adsorption step and the equalizing pressure step performs once in the working procedure; do the creation of vacuum on the adsorption tower through the vacuum pipe-line G15 using the vacuum pump P1. The second stage pressure-swing adsorption device is composed of four adsorption towers 2A~2D; the adsorbent in the adsorption tower of the second stage is molecular sieve; single tower is simultaneously in an adsorption step and the equalizing pressure step performs once in the working procedure. The third stage pressure-swing adsorption device is composed of four adsorption towers 3A~3D; the adsorbent in the adsorption tower of the third stage is carbon molecular sieve or oxygen adsorption equilibrium adsorbent; single tower is simultaneously in an adsorption step and purge-depressurization is performed in the working procedure. This example adopts three-stage pressure-swing adsorption device mentioned above operating in series. The first stage is used to remove the gaseous water, carbon dioxide and partial nitrogen in the air, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in gas mixture which is discharged from the adsorption tower in the adsorption step of the second stage and increase the concentration of oxygen up to above 99.5V %.

The air enters into the adsorption tower in adsorption step of the first stage. The adsorbents in the adsorption tower adsorb selectively vaporous water, carbon dioxide and partial nitrogen etc. in turn from the air. The nonadsorbed partial nitrogen, weakly adsorbed oxygen and argon etc. are discharged from the outlet and enter into the adsorption tower in adsorption step of the second stage. The molecular sieve in the adsorption tower of the second stage adsorbs selectively nitrogen. The weakly adsorbed oxygen and argon etc. are discharged from the outlet and enter into buffer vessel of oxygen-enriched product. The third stage pressure-swing adsorption device is used to further remove the nitrogen and argon in gas mixture which is discharged from the adsorption tower in the adsorption step of the second stage and increase the concentration of oxygen up to above 99.5V %. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, the second stage gas backward equalization repressurization 2ER, purge gas repressurization R', final repressurization FR. The concentration of oxygen in the outlet gas discharged from the adsorption tower in the adsorption step of the second stage should be controlled at about 70~95% (V); the adsorption tower of the second stage sequentially undergoes the following steps in one circulation period: adsorption A, backward equalization depressurization BD', and final repressurization FR. The third stage pressure-swing adsorption device is used to increase the concentration of oxygen in the outlet gas discharged from the adsorption tower in the adsorption step of the second stage up to 99.5V %. The adsorption tower of the third stage sequentially undergoes the following steps in one circulation period: adsorption A, oxygen product purge P', oxygen product depressurization D, and purge gas repressurization R'.

Taking the adsorption tower 1A as an example and crossing reference to FIG. 1 and FIG. 4, we demonstrate the steps of the adsorption tower of the first stage in one circulation period in this example:

(1) Adsorption A

By now, the adsorption tower 1A has completed FR step. The air enters into the adsorption tower 1A through the pipeline G11 by opening the sequence valves 11A, 12A. In tower 1A, the adsorbents adsorb selectively water, carbon dioxide and partial nitrogen etc. in turn from the air. The nonadsorbed partial nitrogen and weakly adsorbed argon, etc. are discharged from the outlet and enter into the adsorption tower in adsorption step of the second stage. The total amount of adsorbed water, carbon dioxide and partial nitrogen etc. increases gradually with the increase of time. Stop feeding air when the adsorbents are saturated by the components mentioned above, and the adsorption ends here. Close the sequence valves 11A, 12A. The concentration of nitrogen in the outlet gas should be controlled at 70~78% (V).

(2) Purge P'

After the adsorption step, the outlet gas from the vacuum pump enters into the adsorption tower 1C through the pipeline G16 and G14 to perform the purge gas repressurization step (abbr. R') by opening the sequence valves 16A, 14A and 14C. When the concentration of nitrogen in the adsorption tower 1A meets the requirement, close 16A, 14A and 14C.

(3) Evacuation VC

After the purge P' step, open the sequence valve 15A, the adsorbed water, carbon dioxide and nitrogen are taken out from the bottom of the adsorption tower with vacuum pump to vent to the atmosphere or act as product, and the absorbents are regenerated at the same time.

(4) The Second Stage Gas Backward Equalization Repressurization 2ER

After the evacuation VC step, open the sequence valves 25a, 14A and KV8. The gas of the BD' step in the adsorption tower 2a of the second stage enters into the adsorption tower 1A to increase the pressure of the adsorption tower 1A.

(5) Final Repressurization FR

After the 2ER step, open the sequence valves KV6 and 13A. The outlet gas from the adsorption tower in the adsorption step enters from the top of the adsorption tower 1A to increase the pressure of it. When the pressure of the adsorption tower 1A reaches near the adsorption pressure, close KV6 and 13A.

Thus, the adsorption tower 1A has completed a circulation period and can enter into the next circulation again. The circulation steps of the adsorption tower 1B~1D are the same as tower 1A, but the operating time is staggered each other, see also FIG. 1 and FIG. 4.

Taking the adsorption tower 2a as an example and crossing reference to FIG. 2 and FIG. 4, we demonstrate the steps of the adsorption tower of the second stage in one circulation period in this example now:

(1) Adsorption A

By now, the adsorption tower 2a has completed the FR step. The interim gas mixture enters into the adsorption tower 2a through the pipeline G21 by opening the sequence valves 21a, 22a. In tower 2a, the outlet gas from the adsorption tower in adsorption step of the first stage enters into the adsorption tower in adsorption step of the second stage. The adsorbent in the adsorption tower adsorbs selectively nitrogen. The weakly adsorbed oxygen and argon, etc. are discharged from the outlet and enter into enriched oxygen buffer vessel or the next step. The total amount of adsorbed nitrogen increases gradually with the increase of time. Stop feeding gas when the adsorbent is saturated by nitrogen, and the adsorption ends here. Close 21a, 22a.

(2) Backward Equalization Depressurization BD'

After the adsorption step, open the sequence valves 25a, 14A and KV8. The gas in the adsorption tower 2a enters into the adsorption tower 1A backward to increase the pressure of it.

(3) Final Repressurization FR

After the BD' step, open the sequence valves KV7 and 23a. The outlet gas from the adsorption tower in the adsorption step enters from the top of the adsorption tower 2a to increase the pressure of it. When the pressure of the adsorption tower 2a reaches near the adsorption pressure, close KV7 and 23a.

Thus, the adsorption tower 2a has completed a circulation period and can enter into the next circulation again. The circulation steps of the adsorption tower 2b~2h are the same as 2a, but the operating time is staggered each other, see also FIG. 2 and FIG. 4.

Taking the adsorption tower 3A as an example and crossing reference to FIG. 3 and FIG. 4, we demonstrate the steps of the adsorption tower of the third stage in one circulation period in this example:

(1) Adsorption A

By now, the adsorption tower 3A has completed R' step. The oxygen-enriched gas enters into the adsorption tower 3A through the pipeline G31 by opening the sequence valve 31A. When the pressure of the adsorption tower 3A is increased to the adsorption pressure, open the sequence valve 32A. In tower 3A, the adsorbent adsorbs selectively oxygen in turn from the oxygen-enriched gas mixture. The nonadsorbed nitrogen or argon, etc. are discharged from the outlet to vent to the atmosphere or serve as other use. The total amount of adsorbed oxygen increases gradually with the increase of time. Stop feeding gas when the adsorbent is saturated by oxygen mentioned above, and the adsorption ends here. Close the sequence valves 31A, 32A. The concentration of oxygen in the outlet gas should be controlled at 5~50% (V).

(2) Purge P'

After the adsorption step, the outlet gas from the compressor enters into the adsorption tower 3C through the pipeline G36 and G33 to perform the purge gas repressurization step (abbr. R') by opening the sequence valves 36A, 34A and 34C. When the concentration of oxygen in the outlet gas mixture of the adsorption tower 3A meets the requirement, close 36A, 34A and 34C.

(3) Oxygen Product Depressurization D

After the purge P' step, by opening the sequence valves 33A, 36B, 34B and 34D at first, the oxygen product is discharged from the adsorption tower and is pressurized to the adsorption pressure to purge the adsorption tower 3B. And then the oxygen product is discharged from the adsorption tower and enters into the next step by opening the sequence valve 35A at the end of purging.

(4) Purge Gas Repressurization R'

After the oxygen product depressurization D step, the outlet gas discharged from the adsorption tower 3C in the purge P' step lifts the pressure of the adsorption tower by opening the sequence valve 34A.

Thus, the adsorption tower 3A has completed a circulation period and can enter into the next circulation again. The circulation steps of the adsorption tower 3B~3D are the same as tower 3A, but the operating time is staggered each other, see also FIG. 3 and FIG. 4.

The result of this example is that the concentration of oxygen is above 99.5% (v), the concentration of nitrogen is above 99.9% (v), and the recovery of oxygen is above 99.5% (v).

EXAMPLE 2

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | | |
|---|---|---|---|---|---|---|
| | $O_2$ | $N_2$ | Ar | $CO_2$ | others | Σ |
| Conc. (%) (V) | 20.93 | 78.03 | 0.932 | 0.03 | 0.078 | 100 |

Temp.: ≦45° C.
Pressure: 0.3 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER, final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, purge gas repressurization R'.

The result of this example is that the concentration of oxygen is above 99.5% (v), the concentration of nitrogen is above 99.9% (v), and the recovery of oxygen is above 99.5% (v).

EXAMPLE 3

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | $O_2$ | $N_2$ | Ar | $CO_2$ | others | Σ |
| Conc. (%) (V) | 20.93 | 78.03 | 0.932 | 0.03 | 0.078 | 100 |

Temp.: ≦45° C.
Pressure: 0.2 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER, final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, oxygen product purge P', oxygen product depressurization D, purge gas repressurization R', backward equalization repressurization ER.

The result of this example is that the concentration of oxygen is above 99.5% (v), the concentration of nitrogen is above 99.9% (v), and the recovery of oxygen is above 99.5% (v).

EXAMPLE 4

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.2 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, oxygen product purge P', oxygen product depressurization D, purge gas repressurization R', backward equalization repressurization ER.

The result of this example is that the concentration of oxygen is above 99.5% (v), the concentration of nitrogen is above 99.9% (v), and the recovery of oxygen is above 99.5% (v).

EXAMPLE 5

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.3 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', purge P', evacuation VC, third second stage gas backward equalization repressurization 2ER3, second second stage gas backward equalization repressurization 2ER2, first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER, final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, purge gas repressurization R'.

The result of this example is that the concentration of oxygen is above 99.5% (v), the concentration of nitrogen is above 99.9% (v), and the recovery of oxygen is above 99.5% (v).

EXAMPLE 6

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.2 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', purge P', evacuation VC, third second stage gas backward equalization repressurization 2ER3, second second stage gas backward equalization repressurization 2ER2, first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, oxygen product purge P', oxygen product depressurization D, purge gas repressurization R', backward equalization repressurization ER.

The result of this example is that the concentration of oxygen is above 99.5% (v), the concentration of nitrogen is above 99.9% (v), and the recovery of oxygen is above 99.5% (v).

EXAMPLE 7

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

|  | Component | | | | | |
| --- | --- | --- | --- | --- | --- | --- |
|  | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.2 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', purge P', evacuation VC, third second stage gas backward equalization repressurization 2ER3, second second stage gas backward equalization repressurization 2ER2, first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, oxygen product purge P', oxygen product depressurization D, purge gas repressurization R', backward equalization repressurization ER.

The result of this example is that the concentration of oxygen is above 99.5% (v), the concentration of nitrogen is above 99.9% (v), and the recovery of oxygen is above 99.5% (v).

EXAMPLE 8

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

|  | Component | | | | | |
| --- | --- | --- | --- | --- | --- | --- |
|  | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.1 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period:

adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER, final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, evacuation VC, purge gas repressurization R'.

The result of this example is that the concentration of oxygen is above 99.5% (v), the concentration of nitrogen is above 99.9% (v), and the recovery of oxygen is above 99.5% (v).

EXAMPLE 9

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.1 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, second stage gas backward equalization repressurization 2ER, purge gas repressurization R', final repressurization FR. The concentration of oxygen in the outlet gas discharged from the adsorption tower in the adsorption step of the second stage should be controlled at about 70-95% (V); the adsorption tower of the second stage sequentially undergoes the following steps in one circulation period: adsorption A, backward equalization depressurization BD', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, evacuation VC, purge gas repressurization R'.

The result of this example is that the concentration of oxygen is above 99.5% (v), the concentration of nitrogen is above 99.9% (v), and the recovery of oxygen is above 99.5% (v).

EXAMPLE 10

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.2 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period:

adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, oxygen product purge P', oxygen product depressurization D, evacuation VC, purge gas repressurization R', backward equalization repressurization ER.

The result of this example is that the concentration of oxygen is above 99.5% (v), the concentration of nitrogen is above 99.9% (v), and the recovery of oxygen is above 99.5% (v).

EXAMPLE 11

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≤45° C.
Pressure: 0.2 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', purge P', evacuation VC, third second stage gas backward equalization repressurization 2ER3, second second stage gas backward equalization repressurization 2ER2, first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, oxygen product purge P', oxygen product depressurization D, evacuation VC, purge gas repressurization R', backward equalization repressurization ER.

The result of this example is that the concentration of oxygen is above 99.5% (v), the concentration of nitrogen is above 99.9% (v), and the recovery of oxygen is above 99.5% (v).

EXAMPLE 12

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | | |
|---|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≤45° C.
Pressure: 0.3 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', backward depressurization BD, purge P', evacuation VC, third second stage gas backward equalization repressurization 2ER3, second second stage gas backward equalization repressurization 2ER2, first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, purge gas repressurization R'.

The result of this example is that the concentration of oxygen is above 99.5% (v), the concentration of nitrogen is above 99.9% (v), and the recovery of oxygen is above 99.5% (v).

EXAMPLE 13

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | | |
|---|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.5 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, purge gas repressurization R'. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 99.5% (v), the concentration of nitrogen is above 99.9% (v), and the recovery of oxygen is above 99.5% (v).

EXAMPLE 14

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | | |
|---|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.3 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, purge gas repressurization R'. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 99.5% (v), the concentration of nitrogen is above 99.9% (v), and the recovery of oxygen is above 99.5% (v).

EXAMPLE 15

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | | |
|---|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.3 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', purge P', backward depressurization BD, third second stage gas backward equalization repressurization 2ER3, second second stage gas backward equalization repressurization 2ER2, first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization depressurization ER, final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, purge gas repressurization R'.

The result of this example is that the concentration of oxygen is above 99.5% (v), the concentration of nitrogen is above 99.9% (v), and the recovery of oxygen is above 99.5% (v).

EXAMPLE 16

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| O2 | N2 | Ar | CO2 | others | Σ |
| Conc. (%) (V) 20.93 | 78.03 | 0.932 | 0.03 | 0.078 | 100 |

Temp.: ≦45° C.
Pressure: 0.1 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', evacuation VC, third second stage gas backward equalization repressurization 2ER3, second second stage gas backward equalization repressurization 2ER2, first second stage gas backward equalization repressurization 2ER1, two-end equalization repressurization 2ER', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, oxygen product purge P', oxygen product depressurization D, purge gas repressurization R'.

The result of this example is that the concentration of oxygen is above 99.5% (v), the concentration of nitrogen is above 99.9% (v), and the recovery of oxygen is above 99.5% (v).

EXAMPLE 17

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| O2 | N2 | Ar | CO2 | others | Σ |
| Conc. (%) (V) 20.93 | 78.03 | 0.932 | 0.03 | 0.078 | 100 |

Temp.: ≦45° C.
Pressure: 0.3 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, oxygen product depressurization D, backward equalization repressurization ER.

The result of this example is that the concentration of oxygen is above 99.5% (v), the concentration of nitrogen is above 99.9% (v), and the recovery of oxygen is above 99.5% (v).

EXAMPLE 18

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product). The third stage is used to further remove the nitrogen and argon in gas mixture which is discharged from the adsorption tower in the adsorption step of the second stage and increase the concentration of oxygen up to above 99.5% (V).

The components of air in this example are as following:

| | Component | | | | |
|---|---|---|---|---|---|
| | O2 | N2 | Ar | CO2 | others | Σ |
| Conc. (%) (V) | 20.93 | 78.03 | 0.932 | 0.03 | 0.078 | 100 |

Temp.: ≦45° C.
Pressure: 0.5 MPa (G)

The adsorbents in the adsorption tower of the first stage are activated alumina and molecular sieve in turn from the bottom up. The adsorbent in the adsorption tower of the second stage is molecular sieve. The adsorbent in the adsorption tower of the third stage is carbon molecular sieve or oxygen adsorption equilibrium adsorbent. This example adopts three-stage pressure-swing adsorption device mentioned above operating in series. The first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, third second stage gas backward equalization repressurization 2ER3, second second stage gas backward equalization repressurization 2ER2, first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', final repressurization FR. The third stage is used to further remove the nitrogen and argon in gas mixture which is discharged from the adsorption tower in the adsorption step of the second stage and increase the concentration of oxygen up to above 99.5% (V). The adsorption tower of the third stage sequentially undergoes the following steps in one circulation period: adsorption A, cocurrent equalization depressurization ED, evacuation VC, backward equalization repressurization ER.

The result of this example is that the concentration of oxygen is above 99.5% (v), the concentration of nitrogen is above 99.9% (v), and the recovery of oxygen is above 99.5% (v).

The present invention can be applied to a wide range of the industrial field of chemical engineering, petrochemical processing, pharmacy, building materials, environmental protection and so on.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method of making oxygen with three-stage pressure-swing adsorption device, wherein oxygen and nitrogen are separated from air; the production can be oxygen or nitrogen or both of them; the method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in oxygen-enriched gas mixture which is discharged from the adsorption tower in the adsorption step of the second stage and increase the concentration of oxygen up to above 95V %; the adsorption tower of the first stage sequentially undergoes the following steps in one circulation period: adsorption A, purge P', evacuation VC, the second stage gas backward equalization repressurization 2ER, purge gas repressurization R', final repressurization FR; the adsorption tower of the second stage sequentially undergoes the following steps in one circulation period: adsorption A, backward equalization depressurization BD', final repressurization FR; the adsorption tower of the third stage sequentially undergoes the following steps in one circulation period: adsorption A, oxygen product purge P', oxygen product depressurization D, and purge gas repressurization R'.

2. The method of claim 1, wherein the adsorption tower of the second stage adds the cocurrent equalization depressurization ED step after the adsorption A step, and adds the backward equalization repressurization ER step after the backward equalization depressurization BD' step in the meantime; the gas mixture of the repressurization ER step comes from the depressurization ED step;

and/or the adsorption tower of the third stage adds the cocurrent equalization depressurization ED step after the adsorption A step, and adds the backward equalization repressurization ER step after the purge gas repressurization R' step in the meantime; the gas mixture of the repressurization ER step comes from the depressurization ED step.

3. The method of claim 1, wherein the adsorption tower of the first stage adds the two-end equalization depressurization 2ED' step after the adsorption A step, and adds the two-end equalization repressurization 2ER' step after the second stage gas backward equalization repressurization 2ER step in the meantime; the gas mixture of the two-end equalization repressurization 2ER' step comes from the equalization depressurization 2ED' step.

4. The method of claim 1, wherein the adsorption tower of the third stage adds evacuation VC step after the oxygen product depressurization D step.

5. The method of claim 3, wherein the adsorption tower of the third stage adds evacuation VC step after the oxygen product depressurization D step.

6. The method of claim 3, wherein the adsorption tower of the first stage adds backward depressurization BD step after the purge P' step.

7. The method of claim 1, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

8. The method of claim 3, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

9. The method of claim 4, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

10. The method of claim 1, wherein the average concentration of oxygen in outlet gas, which comes from the adsorption tower in the adsorption step of the first stage, is 21~80 V %.

11. The method of claim 3, wherein the average concentration of oxygen in outlet gas, which comes from the adsorption tower in the adsorption step of the first stage, is 21~80 V %.

12. The method of claim 4, wherein the average concentration of oxygen in outlet gas, which comes from the adsorption tower in the adsorption step of the first stage, is 21~80 V %.

13. The method of claim 10, wherein the average concentration of oxygen in outlet gas, which comes from the adsorption tower in the adsorption step of the first stage, is 21~25 V %.

14. The method of claim 11, wherein the average concentration of oxygen in outlet gas, which comes from the adsorption tower in the adsorption step of the first stage, is 21~25 V %.

15. The method of claim 12, wherein the average concentration of oxygen in outlet gas, which comes from the adsorption tower in the adsorption step of the first stage, is 21~25 V %.

16. The method of claim 1, wherein the pressure of adsorption step A of three-stage pressure-swing adsorption device is 0.001~0.6 Mpa(g);
or
the pressure of adsorption step A of the first stage and the second stage pressure-swing adsorption device is 0.001~0.05 Mpa(g); the pressure of adsorption step A of the third stage pressure-swing adsorption device is 0.1~0.6 Mpa(g).

17. The method of claim 3, wherein the pressure of adsorption step A of three-stage pressure-swing adsorption device is 0.001~0.6 Mpa(g);
or
the pressure of adsorption step A of the first stage and the second stage pressure-swing adsorption device is 0.001~0.05 Mpa(g); the pressure of adsorption step A of the third stage pressure-swing adsorption device is 0.1~0.6 Mpa(g).

18. The method of claim 4, wherein the pressure of adsorption step A of three-stage pressure-swing adsorption device is 0.001~0.6 Mpa(g);
or
the pressure of adsorption step A of the first stage and the second stage pressure-swing adsorption device is 0.001~0.05 Mpa(g); the pressure of adsorption step A of the third stage pressure-swing adsorption device is 0.1~0.6 Mpa(g).

19. The method of claim 1, wherein the adsorbents which are packed in the adsorption tower of the first stage are activated alumina and molecular sieve from the bottom up; the adsorbent which is packed in the adsorption tower of the second stage is molecular sieve only; and the adsorbent which is packed in the adsorption tower of the third stage is oxygen adsorption equilibrium adsorbent or selective adsorbent of oxygen by adsorption kinetics.

20. The method of claim 3, wherein the adsorbents which are packed in the adsorption tower of the first stage are activated alumina and molecular sieve from the bottom up; the adsorbent which is packed in the adsorption tower of the second stage is molecular sieve only; and the adsorbent which is packed in the adsorption tower of the third stage is oxygen adsorption equilibrium adsorbent or selective adsorbent of oxygen by adsorption kinetics.

21. The method of claim 4, wherein the adsorbents which are packed in the adsorption tower of the first stage are activated alumina and molecular sieve from the bottom up; the adsorbent which is packed in the adsorption tower of the second stage is molecular sieve only; and the adsorbent which is packed in the adsorption tower of the third stage is oxygen adsorption equilibrium adsorbent or selective adsorbent of oxygen by adsorption kinetics.

22. The method of claim 1, wherein the frequency of the backward equalization depressurization ED' step in the adsorption tower of the second stage and the frequency of the second stage gas backward equalization repressurization 2ER step in the adsorption tower of the first stage are more than or equal to 1.

23. The method of claim 3, wherein the frequency of the backward equalization depressurization ED' step in the adsorption tower of the second stage and the frequency of the second stage gas backward equalization repressurization 2ER step in the adsorption tower of the first stage are more than or equal to 1.

24. The method of claim 4, wherein the frequency of the backward equalization depressurization ED' step in the adsorption tower of the second stage and the frequency of the second stage gas backward equalization repressurization 2ER step in the adsorption tower of the first stage are more than or equal to 1.

25. The method of claim 18, wherein the frequency of the backward equalization depressurization ED' step in the adsorption tower of the second stage and the frequency of the second stage gas backward equalization repressurization 2ER step in the adsorption tower of the first stage are 3~7.

26. The method of claim 19, wherein the frequency of the backward equalization depressurization ED' step in the adsorption tower of the second stage and the frequency of the second stage gas backward equalization repressurization 2ER step in the adsorption tower of the first stage are 3~7.

27. The method of claim 20, wherein the frequency of the backward equalization depressurization ED' step in the adsorption tower of the second stage and the frequency of the second stage gas backward equalization repressurization 2ER step in the adsorption tower of the first stage are 3~7.

28. A method of making oxygen with three-stage pressure-swing adsorption device, wherein oxygen and nitrogen are separated from air; the production can be oxygen or nitrogen or both of them; the method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in oxygen-enriched gas mixture which is discharged from the adsorption tower in the adsorption step of the second stage and increase the concentration of oxygen up to above 95V %; the adsorption tower of the first stage sequentially undergoes the following steps in one circulation period: adsorption A, two-end equalization depressurization 2ED', purge P', backward depressurization BD, the second stage gas backward equalization repressurization 2ER, two-end equalization repressurization 2ER', purge gas repressurization R', final repressurization FR; the adsorption tower of the second stage sequentially undergoes the following steps in one circulation period: adsorption A, cocurrent equalization depressurization ED, backward equalization depressurization BD', backward equalization repressurization ER, final repressurization FR; the adsorption tower of the third stage sequentially undergoes the following steps in one circulation period: adsorption A, oxygen product purge P', oxygen product depressurization D, and purge gas repressurization R'.

29. The method of claim 28, wherein the pressure of adsorption A step of three-stage pressure-swing adsorption device is 0.2~0.6 Mpa(g).

30. A method of making oxygen with three-stage pressure-swing adsorption device, wherein oxygen and nitrogen are separated from air; the production can be oxygen or nitrogen or both of them; the method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level and the third stage pressure-swing adsorption device is used to further remove the nitrogen and argon in oxygen-enriched gas mixture which is discharged from the adsorption tower in the adsorption step of the second stage and increase the concentration of oxygen up to above 95V %; the adsorption tower of the first stage sequentially undergoes the following steps in one circulation period: adsorption A, two-end equalization depressurization 2ED', evacuation VC, the second stage gas backward equalization repressurization 2ER, two-end equalization repressurization 2ER', final repressurization FR; the adsorption tower of the second stage sequentially undergoes the following steps in one circulation period: adsorption A, backward equalization depressurization BD', final repressurization FR; the adsorption tower of the third stage sequentially undergoes the following steps in one circulation period: adsorption A, oxygen product purge P', oxygen product depressurization D, and purge gas repressurization R'.

31. The method of claim 30, wherein the adsorption tower of the second stage adds the cocurrent equalization depressurization ED step after the adsorption A step, and adds the backward repressurization ER step after the backward equalization depressurization BD' step in the meantime; the gas mixture of the repressurization ER step comes from the depressurization ED step.

32. The method of claim 30, wherein the adsorption tower of the first stage adds the backward depressurization BD step after the two-end equalization depressurization 2ED' step.

33. The method of claim 30, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

34. The method of claim 30, wherein the pressure of adsorption A step of three-stage pressure-swing adsorption device is 0.005~0.6 Mpa(g).

35. A method of making oxygen with three-stage pressure-swing adsorption device, wherein oxygen and nitrogen are separated from air; the production can be oxygen or nitrogen or both of them; the method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in oxygen-enriched gas mixture which is discharged from the adsorption tower in the adsorption step of the second stage and increase the concentration of oxygen up to above 95V %; the adsorption tower of the first stage sequentially undergoes the following steps in one circulation period: adsorption A, purge P', evacuation VC, the second stage gas backward equalization repressurization 2ER, purge gas repressurization R', final repressurization FR; the adsorption tower of the second stage sequentially undergoes the following steps in one circulation period: adsorption A, backward equalization depressurization BD', final repressurization FR; the adsorption tower of the third stage sequentially undergoes the following steps in one circulation period: adsorption A, cocurrent equalization depressurization ED, oxygen product depressurization D, and backward equalization repressurization ER.

36. The method of claim 35, wherein the adsorption tower of the third stage adds the evacuation VC step after the oxygen product depressurization D step.

37. The method of claim 35, wherein the adsorbents which are packed in the adsorption tower of the first stage are activated alumina and molecular sieve from the bottom up; the adsorbent which is packed in the adsorption tower of the second stage is molecular sieve only; and the adsorbent which is packed in the adsorption tower of the third stage is oxygen adsorption equilibrium adsorbent or selective adsorbent of oxygen by adsorption kinetics.

38. A method of making oxygen with three-stage pressure-swing adsorption device, wherein oxygen and nitrogen are separated from air; the production can be oxygen or nitrogen or both of them; the method adopts three-stage pressure-swing adsorption device operating in series, wherein the first stage pressure-swing adsorption device is used to remove carbon dioxide and water as well as partial nitrogen and enrich nitrogen, the second stage pressure-swing adsorption device is used to further remove the nitrogen in interim gas which is discharged from the adsorption tower in the adsorption step of the first stage and increase the concentration of oxygen up to the desired level, and the third stage pressure-swing adsorption device is used to further remove the nitrogen and argon in oxygen-enriched gas mixture which is discharged from the adsorption tower in the adsorption step of the second stage and increase the concentration of oxygen up to above 95V %; the adsorption tower of the first stage sequentially undergoes the following steps in one circulation period: adsorption A, purge P', evacuation VC, the second stage gas backward equalization repressurization 2ER, purge gas repressurization R', final repressurization FR; the adsorption tower of the second stage sequentially undergoes the following steps in one circulation period: adsorption A, backward equalization depressurization BD', final repressurization FR; the adsorption tower of the third stage sequentially undergoes the following steps in one circulation period: adsorption A, cocurrent equalization depressurization ED, evacuation VC, and backward equalization repressurization ER.

* * * * *